March 12, 1940. G. H. BETTS 2,193,266
TARGET TRAP
Filed April 15, 1939 3 Sheets-Sheet 1
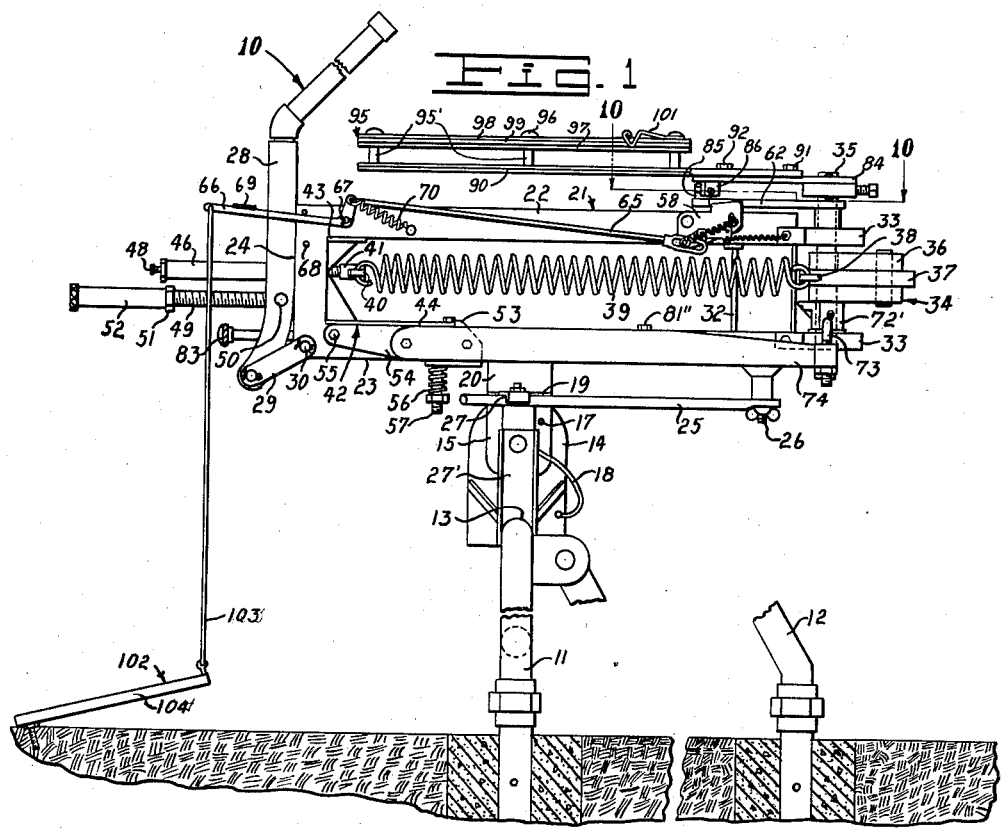
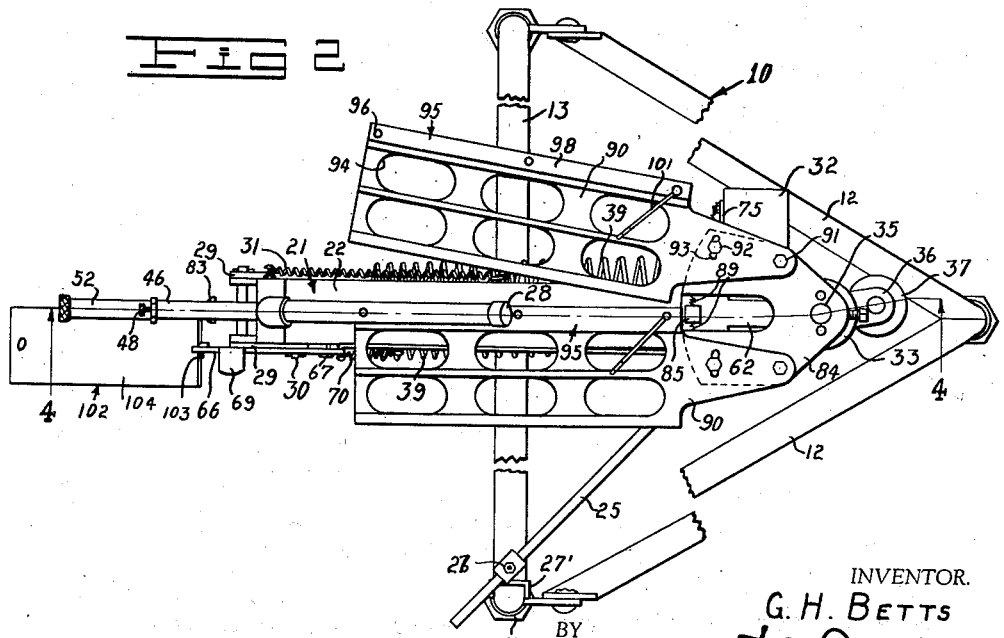
INVENTOR.
G. H. BETTS
BY
ATTORNEY.

March 12, 1940. G. H. BETTS 2,193,266
TARGET TRAP
Filed April 15, 1939 3 Sheets-Sheet 2
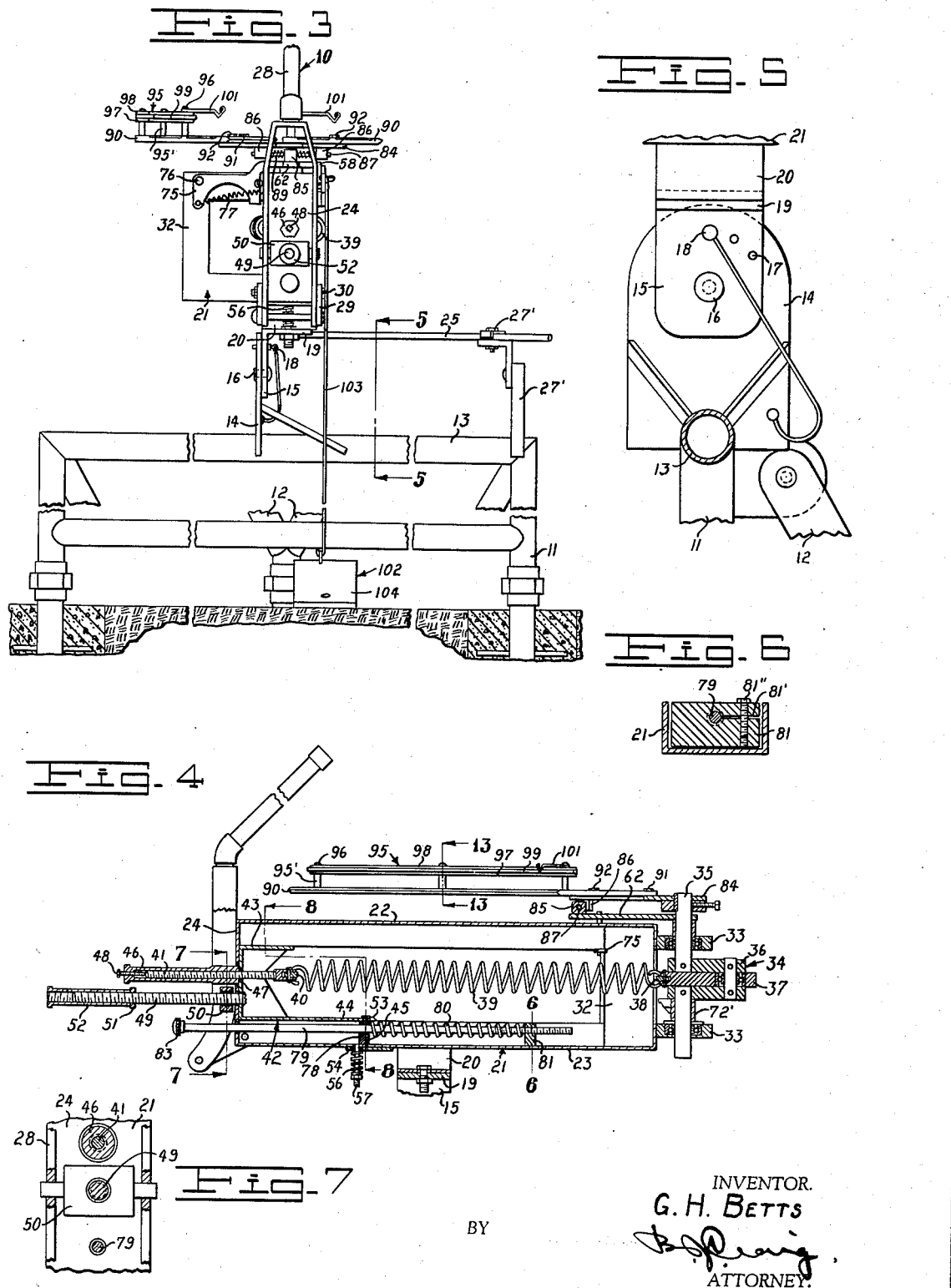
INVENTOR.
G. H. BETTS
BY
ATTORNEY.

March 12, 1940. G. H. BETTS 2,193,266
TARGET TRAP
Filed April 15, 1939 3 Sheets-Sheet 3
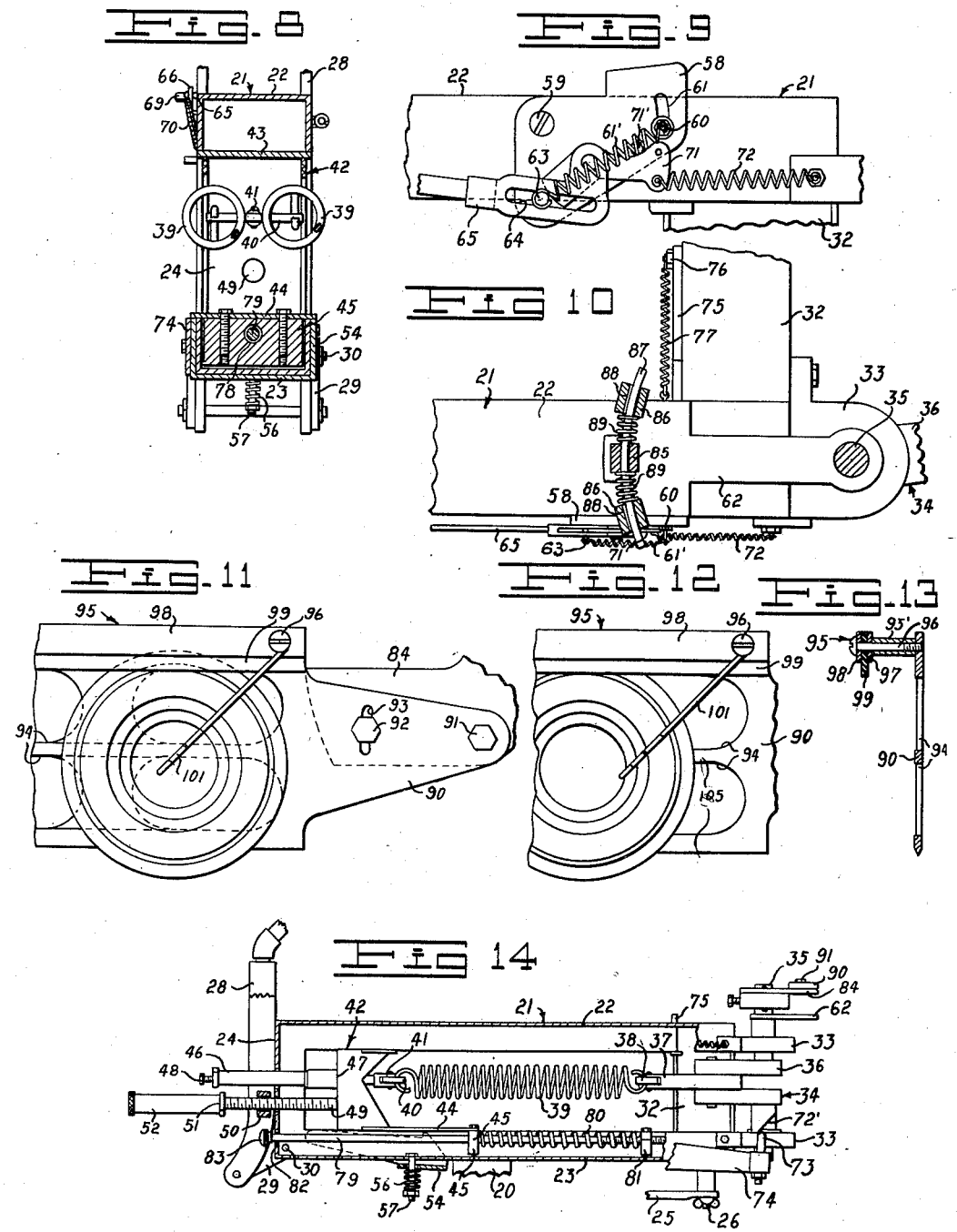
INVENTOR.
G. H. BETTS
BY
ATTORNEY.

Patented Mar. 12, 1940

2,193,266

UNITED STATES PATENT OFFICE 2,193,266

TARGET TRAP

George H. Betts, Altadena, Calif.

Application April 15, 1939, Serial No. 268,108

9 Claims. (Cl. 124—8)

This invention relates to target traps.

The general object of the invention is to provide an improved target trap for throwing clay pigeons.

A more specific object of the invention is to provide a target trap including a novel throwing arm.

Another object of the invention is to provide a target trap including a novel means for operating the throwing arm.

A further object of the invention is to provide a novel shock absorber means for the throwing arm of the target trap.

An additional object of the invention is to provide a novel mounting for the target trap.

A further object of the invention is to provide novel release means for a target trap.

Other objects and the advantages of this invention will be apparent from the following description taken in connection with the accompanying drawings, wherein:

Fig. 1 is a side elevation, partly in section, showing a target trap embodying the features of my invention;

Fig. 2 is a top plan view of the trap shown in Fig. 1 with parts broken away;

Fig. 3 is a rear view of the trap shown in Fig. 1 with parts broken away;

Fig. 4 is a fragmentary section taken on line 4—4 of Fig. 2;

Fig. 5 is a fragmentary section taken on line 5—5 of Fig. 3;

Fig. 6 is a section taken on line 6—6 of Fig. 4;

Fig. 7 is a fragmentary section taken on line 7—7 of Fig. 4;

Fig. 8 is a section taken on line 8—8 of Fig. 4;

Fig. 9 is a fragmentary elevation of one of the dogs and its associated parts;

Fig. 10 is a fragmentary section taken on line 10—10 of Fig. 1;

Fig. 11 is a fragmentary top plan view of one of the throwing arms with a clay pigeon thereon;

Fig. 12 is a view similar to Fig. 11 with the clay pigeon in another position;

Fig. 13 is a section taken on line 13—13 of Fig. 4; and

Fig. 14 is a side elevation shown partly in section of the target trap shown in Fig. 1 with the parts in another position.

Referring to the drawings by reference characters I have shown my invention as embodied in a target trap which is indicated generally at 10. As shown the trap includes an inverted U-shaped member 11 which is suitably supported. The member 11 is braced by members 12 which converge downwardly and which are suitably supported. The top portion 13 of the member 11 has a plate 14 secured thereto intermediate its length and on this plate I mount a bracket 15 on a pivot 16.

Holes 17 in the bracket are adapted to receive a suitable fastening means 18 which passes through the plate 14 to hold the bracket in adjusted position. The bracket includes a horizontal top portion 19 which engages the lower portion 20 of a frame 21.

This frame includes top and bottom members 22 and 23 and a rear member 24 all the members being preferably of channel shape. A brace rod 25 releasably engages the forward end of the frame at 26 and at its rear end 27 is pivotally mounted on a bracket 27' which is suitably secured to the member 11. A handle 28 is pivotally connected to links 29 which in turn are pivotally connected at 30 to the frame. A spring 31 engaging the handle and frame normally retains the handle in advanced position.

At its front the frame includes an offset portion 32 the top and bottom of which are flush with the top and bottom respectively of the frame.

Mounted on the frame I show a pair of brackets 33 which support a crank member 34. This crank member includes a main shaft 35 having a crank 36, the latter supporting a crank member 37. The crank member includes ears 38 which engage the ends of a pair of springs 39. The other ends of the springs 39 are secured in ears 40 in an anchor member 41.

A carriage 42 includes an upper plate 43 which slidably engages the lower surface of the top member 22 of the frame and includes a lower plate 44 which is longer than the plate 43 and which slidably engages the surface of the lower member 23 of the frame. The plate 44 includes a guide 45 which fits within the lower frame member and prevents lateral movement of the carriage.

The anchor member 41 is threaded into a tube 46 which bears against the carriage at 47. A lock screw 48 passes through the end of the tube and engages the anchor member to prevent accidental turning of the anchor member. Mounted on the rear end of the carriage I show a threaded rod 49 which passes through a block 50 which has pintles on each end passing through holes in the handle 28. The outer end of the rod includes a nut 51 which engages the block 50. An elongated locking nut 52 covers the rear end of the rod and protects the thread at the free end of the rod.

The construction is such that when the handle is pulled the block 50 pulls the rod 49 and the latter pulls the carriage thus tensioning the spring 39. This action is continued until the forward end of the lower plate 44 passes beyond the jaws 53 of a dog 54 pivoted at 55 on the lower frame member and normally urged to engaged position by a spring 56 on a post 57 on the lower frame member.

The crank member 34 as shown in the drawing is normally at one side of the center so that the tendency of the spring is to urge this crank to rotate. To prevent rotation of the crank until desired I provide a dog 58 which is pivoted at 59 to the upper frame member. The dog is limited in its up and down movement by a pin 60 which passes through a slot 61 in the dog. The dog projects into the path of an arm 62 mounted on the shaft 35.

The dog includes a pin 63 which passes through a slot 64 in a link 65 which is pivoted to a bell crank 66, the latter being pivoted at 67 to the upper frame member. The dog is urged to normal engaged position by a spring 61' which engages the pins 60 and 63. A stop member 68 limits the movement of the bell crank and the latter is provided with a finger portion 69. A spring 70 engaging the bell crank and upper frame member normally urges the link 65 forward.

Pivotally mounted on the link 65 I show a dog member 71 which is normally urged by a spring 72 into such position that the end of the dog 71 engages the pin 63 on the dog 58 and thus prevents normal release of the dog 58.

The construction is such that when the bell crank 66 is rocked the link 65 is pulled rearwardly thus pulling the dog 71 rearwardly. This dog engages the pin 63 so that through this pin the dog 58 is rocked out of the path of the arms 62 so that when operated the arm 62 is freed permitting the crank to rotate. As soon as the full movement of the bell crank occurs the dog 71 is cammed over the pin 63 by a pin 71' whereupon the dog 58 moves back to its normal position before the bell crank returns to its normal position.

When the crank has rotated through approximately 180° a cam member 72' on the crank shaft engages an adjustable pin 73 threaded into the end of a trip lever 74 which is rigid with the dog 54 and rocks the lever 74 thus moving the dog 54 so that the jaws 53 thereof move out of the path of the lower plate 44. This action frees the carriage so that it moves to relieve the tension of the springs 39 after the crank has passed through an arc of approximately 180°.

A dog 75 is pivoted at 76 on the offset portion of the frame and is normally urged by a spring 77 so that a lip thereon is engaged by the arm 62 which is mounted on the shaft 35 and is moved downwardly by this arm until the latter passes the dog whereupon the dog raises and the lip moves into the path of the arm thus preventing a reverse movement of the arm.

The guide 45 has an aperture 78 therein through which a rod 79 passes. This rod receives a spring 80 which at one end engages the guide 45 and at the other end engages a block 81 which has a threaded aperture which receives the rod 79. The block 81 is slotted as at 81' and threaded to receive a bolt 81'' which serves to prevent rotation of the rod 79.

The rod 79 is extended rearwardly through an aperture 82 in the rear member 24 of the frame where it is provided with a head 83 which is suitably secured as by welding. The outer end of the head 83 is knurled so that it may be turned readily thus turning the rod 79 and moving the block 81 to vary the tension of the spring 80. This spring 80 serves to cushion the return of the carriage after the latter is released.

Mounted on the shaft 35 and spaced above the arm 62 I show another arm 84. The outer end of the arm 62 has an upwardly directed boss 85 which is arranged between bosses 86 on the outer end of the arm 84. An arcuate rod 87 is suitably secured to the boss 85 and has its ends aligned and slidable in apertures 88 in the bosses 86. The rod 87 acts as a guide for springs 89 mounted on both sides of the boss 85 and between the bosses 86.

After the arm 62 has rotated through an arc of 360° further movement is arrested by the dog 58 and the momentum of the arm 84 is taken up in one of the springs 89. The backlash is taken up by the other spring 89.

A pair of throwing arms 90 is secured to the arm 84 by bolts 91 and 92 which engage the arm 84. The bolts 92 are adjustable in slots 93 in the arms 90. The arms 90 project outwardly from the shaft 35 and include flat upper surfaces having parallel sides. The flat surfaces are provided with a plurality of elongated apertures 94 arranged along the length of the arms. Guide rails 95 are spaced from the arm 90 by spacers 95' and supported on a plurality of pins 96 which are in turn secured to the rear edges of the arms 90. The guide rails consist of lower plates 97 and upper plates 98 having a rubber strip 99 therebetween. The rubber strip projects out in front of the plates 97 and 98 and tends to guide and rotate a clay pigeon after it has been released from under a spring 101 which is secured to the inner end of the guide rails 95 by one of the pins 96.

By loosening the bolts 91 and 92 the arms 90 may be adjusted in relation to the arm 84 thereby causing the centrifugal force of the rotating arms to release the pigeon at different locations as desired. Further adjustment may be had by putting the spring 101 in the different indentations in the clay pigeon as shown in Figs. 11 and 12.

If desired, a foot member 102 may be used to rock the bell crank 66 which in turn operates the dog 58. The foot member consists of a rod 103 having one end secured to the rear end of the bell crank 66 and the other end pivotally mounted on the front of a foot pedal 104.

When the pigeon is to be released the foot member 102 is pressed thus freeing the carriage and causing flight of the target.

The dispatching arm 90 includes portions 105 which are engaged by the pigeon as it is accelerated.

In operation a clay pigeon is placed on each dispatching arm and is held in position by the spring 101. The location of the engagement of the spring 101 on the pigeon controls the direction of flight of the pigeon. If the springs bear upon the central portion of the pigeons as illustrated in Fig. 11, the pigeons will be projected in substantially parallel projectories.

If one spring bears upon the pigeon on one of the concentric rings as shown in Fig. 12, that pigeon will follow a projectory divergent from the companion pigeon which is engaged by the spring at its center. By means of the various settings of the springs in the rings or ridges on the pigeon it is possible to cause the pigeons to follow parallel courses or to diverge rapidly from one another in flight or to secure various combinations of movement of the two so that the skill of the gunner may be taxed.

From the foregoing description it will be apparent that I have invented a novel target trap which can be economically manufactured and which is highly efficient for the intended purpose.

Having thus described my invention I claim:

1. In a target projecting device, a frame member, a crank rotatably mounted upon said frame member, a carriage slidably mounted in said frame member, a tension spring connected to said carriage and said crank, an arm on said crank, a dispatching arm adjustably mounted upon said first arm, means upon said dispatching arm to hold and guide a target, a dog on said frame engaging said first arm to hold said first arm in normal cocked position, means to release said arm holding means, means to shift said carriage to tension said spring, and means to free said carriage.

2. In a target projecting device, a frame member, a crank rotatably mounted upon said frame member, a carriage slidably mounted on said frame member, a tension spring connected to said carriage and said crank, a dispatching arm, means including a resilient portion connecting said arm and said crank, means upon said dispatching arm to hold and guide a target, means to hold said dispatching arm in normal cocked position, and means to release said arm holding means, means to shift said carriage to tension said spring, a dog on said frame engaging said carriage to hold the latter in shifted position, and means to free said dog and thereby free the carriage.

3. In a target projecting device, a frame member, a crank rotatably mounted upon said frame member, a carriage shiftably mounted on said frame member, a tension spring connected to said carriage and said crank, a dispatching arm on said crank, means upon said dispatching arm to hold and guide a target, a dog to hold said arm in normal cocked position, means to release said dog, means to shift said carriage to tension said spring, a second dog for holding said carriage in shifted position, means operable by said crank to release the second dog and free said carriage and means engaging the carriage and the frame to cushion the return movement of the carriage.

4. In a target projecting device, a frame member, a crank rotatably mounted upon said frame member, a carriage movably mounted on said frame member, a tension spring connected to said carriage and said crank, an arm mounted upon said crank, a dispatching arm mounted on said first arm, means upon said dispatching arm to hold and guide the target, a dog on said frame engaging the first arm to hold said first arm in normal cocked position, means to release said dog, means to shift said carriage to tension said spring, a second dog on said frame engaging said carriage to hold the latter in shifted position, means to release the second dog and free said carriage and means to cushion the return movement of the carriage.

5. In a target projecting device, a frame member, a crank rotatably mounted upon said frame member, a carriage slidably mounted on said frame member, a tension spring connected to said carriage and said crank, an arm mounted upon said crank, a second arm pivotally mounted on the first arm, a dispatching arm pivotally mounted on said second arm, means to adjust said dispatching arm about its pivot, resilient cushion means on said first arm engaging the second arm, means upon said dispatching arm to hold and guide a target, a dog on said frame engaging said first arm to hold said first arm in normal cocked position, means to release said dog, means to shift said carriage to tension said spring, a second dog on said frame engaging said carriage to hold the latter in shifted position, means operable by said crank to release the second dog and free said carriage and means engaging the carriage and the frame to cushion the return movement of the carriage.

6. In a target projecting device, a frame member, a crank rotatably mounted upon said frame member, a carriage slidably mounted on said frame member, a tension spring connected to said carriage and said crank, an arm mounted upon said crank, a dispatching arm pivotally mounted on said first arm, means to adjust said dispatching arm about its pivots, means upon said dispatching arm to hold and guide the target, a dog on said frame engaging the first arm to hold said first arm in normal cocked position, means to release said dog, means to shift said carriage to tension said spring, a second dog on said frame engaging said carriage to hold the latter in shifted position and means operable by said crank to release the second dog and free said carriage.

7. In a target projecting device, a frame member, a crank rotatably mounted upon said frame member, a carriage slidably mounted on said frame member, a tension spring connected to said carriage and said crank, a pair of dispatching arms mounted upon said crank, means upon said dispatching arms to hold and guide a target, means to hold said dispatching arms in normal cocked position, means to release said arm holding means, means to shift said carriage to tension said spring, a dog on said frame engaging said carriage to hold the latter in shifted position, a cam rotatable with said crank and a lever on said dog and engageable with said cam to release the dog and thereby free said carriage, said cam being located to release the dog prior to a full rotation of the crank.

8. In a target projecting device, a frame member, a crank rotatably mounted upon said frame member, a carriage slidably mounted on said frame member, a tension spring connected to said carriage and said crank, an arm mounted upon said crank, a second arm pivotally mounted on the first arm, a pair of dispatching arms pivotally mounted on said second arm, means to adjust said dispatching arms about their pivots, resilient cushion means on said first arm engaging the second arm, means upon said dispatching arms to hold and guide a target, a dog on said frame engaging said first arm to hold said first arm in normal cocked position, means to release said dog to free said first arm, means to shift said carriage to tension said spring, a second dog on said frame engaging said carriage to hold the latter in shifted position, a cam rotatable with said crank and a lever on said second dog and engageable with said cam to release the second dog and thereby to free said carriage and adjustable means engaging the carriage and the frame to cushion the return movement of the carriage.

9. In a target projecting device, a frame member, a crank rotatably mounted upon said frame member, a carriage slidably mounted on said frame member, a tension spring connected to said carriage and said crank, an arm mounted upon said crank, a second arm pivotally mounted on the first arm, a pair of dispatching arms pivotally mounted on said second arm, means to adjust said dispatching arms about their pivots, resilient cushion means on said first arm engaging the second arm, means upon said dispatching arms to hold and guide a target, a dog on said frame engaging said first arm to hold said first arm in normal cocked position, means to release said dog to free said first arm, means permitting said dog to return to operative engaging position prior to the full movement of the release means, means to shift said carriage to tension said spring, a second dog on said frame engaging said carriage to hold the latter in shifted position, a cam rotatable with said crank and a lever on said second dog and engageable with said cam to release the second dog and thereby free said carriage, adjustable means engaging the carriage and the frame to cushion the return movement of the carriage and means to prevent return movement of the first arm after it has made a full rotation.

GEORGE H. BETTS.